Figure 1:
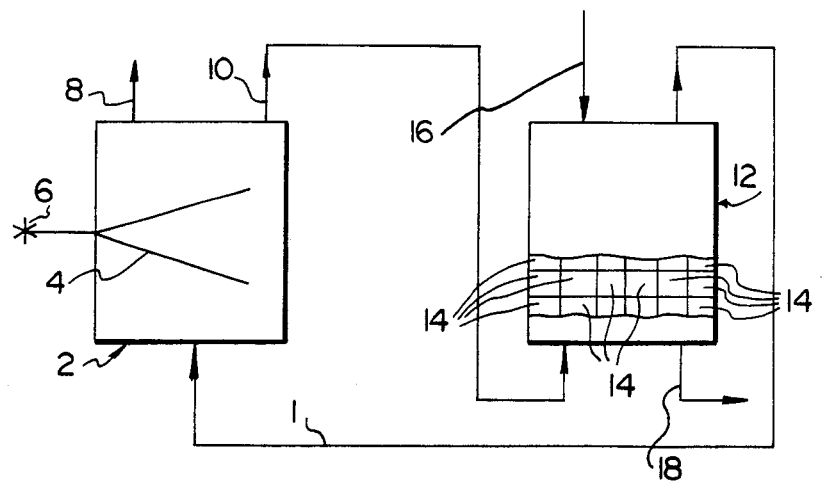

United States Patent [19]

Symons et al.

[11] Patent Number: 4,514,377

[45] Date of Patent: Apr. 30, 1985

[54] PROCESS FOR THE EXCHANGE OF HYDROGEN ISOTOPES BETWEEN STREAMS OF LIQUID WATER AND GASEOUS HALOHYDROCARBON AND AN APPARATUS THEREFOR

[75] Inventors: Edward A. Symons; John H. Rolston, both of Deep River; Michel J. Clermont, Ottawa; Linda M. Paterson, Petawawa, all of Canada

[73] Assignee: Atomic Energy of Canada Limited, Ottawa, Canada

[21] Appl. No.: 444,860

[22] Filed: Nov. 26, 1982

[30] Foreign Application Priority Data

Dec. 4, 1981 [CA] Canada ................................. 391537

[51] Int. Cl.³ .............................................. C01B 5/00
[52] U.S. Cl. ................................ 423/648 A; 422/159; 422/186; 422/189; 422/191; 422/222; 423/249; 423/500
[58] Field of Search .................... 423/648 A, 249, 500; 422/159, 186, 189

[56] References Cited

U.S. PATENT DOCUMENTS 4,081,339  3/1978  Benson ........................... 423/648 A
4,359,368  11/1982  Hammond et al. ................. 423/249

FOREIGN PATENT DOCUMENTS 2849788  6/1979  Fed. Rep. of Germany ... 423/648 A
26922  11/1969  Japan ................................. 422/186
147618  11/1981  Japan ............................. 423/648 A

OTHER PUBLICATIONS

M. J. Astle, J. A. Zaslowsky, Ind. Eng. Chem. 44, 2867 (1952).

I. P. Herman, J. B. Marling, J. Phys. Chem. 85, 493 (1981).

E. A. Symons, M. J. Clermont, J. Am. Chem. Soc. 103, 3127 (1981).

E. A. Symons, M. J. Clermont, L. A. Coderre, J. Am. Chem. Soc. 103, 3131 (1981).

J. C. Vanderleeden, "Generalized Concepts in Large-Scale Laser Isotope Separation, with Application to Deuterium," J. Appl. Phys. 51 (3), Mar. 1980, pp. 1273–1285.

*Primary Examiner*—John Doll
*Assistant Examiner*—Wayne A. Langel
*Attorney, Agent, or Firm*—Francis W. Lemon

[57] ABSTRACT

Hydrogen isotope (e.g. deuterium) exchange from liquid water to a gaseous halohydrocarbon (e.g. fluoroform, $CF_3H$—$CF_3D$) is obtained at an operating temperature in the range 0° to 100° C. using a catalytically active mass comprising a porous anion exchange resin in the hydroxide ion form and enriched gaseous halohydrocarbon stream is decomposed by isotope selective photo-decomposition into a first, gaseous stream enriched in the hydrogen isotope, which is removed as a product, and a depleted gaseous halohydrocarbon stream, which is recirculated for enrichment again. The catalytically active mass may, for example, be in the form of resin particles suspended in a fluidized bed or packed as resin particles between sheets wound into a roll. One of the sheets may be corrugated and have open interstices to form a packing in a column which permits countercurrent gas and liquid flow past the resin. Preferably the wound sheets are hydrophilic to retard flooding by the liquid water. The liquid water stream may contain dimethyl sulfoxide (DMSO) added as co-solvent.

13 Claims, 6 Drawing Figures

PROCESS FOR THE EXCHANGE OF HYDROGEN ISOTOPES BETWEEN STREAMS OF LIQUID WATER AND GASEOUS HALOHYDROCARBON AND AN APPARATUS THEREFOR

This invention relates to a process for the exchange of hydrogen isotopes between streams of liquid water and gaseous halohydrocarbon and an apparatus therefor.

The exchange of hydrogen isotopes between liquid water and gaseous fluoroform (or other similarly volatile halohydrocarbons) is of interest as a potential method for replenishing or for enriching the gaseous fluoroform in one or more of the three known isotopes of hydrogen, namely protium, deuterium or tritium. A stream of gaseous fluoroform or other halohydrocarbon depleted in one hydrogen isotope would be present in a potential hydrogen isotope separation process based on isotope-selective laser photolysis of such a halohydrocarbon gas: see S. A. Tuccio, A. Hartford Jr., Chem. Phys. Letters 65, 234 (1979); J. B. Marling, I. P. Herman, S. J. Thomas, J. Chem. Phys. 72, 5603 (1980); Y. Makide et al, J. Nucl. Sci. Tech. 17, 645 (1980); I. P. Herman, J. B. Marling, J. Phys. Chem. 85, 493 (1981). Replenishment of the depleted isotope, preferably by contact of the halohydrocarbon gas with a liquid water stream, is necessary to permit utilization of the highly selective photolysis step to produce the enriched hydrogen isotope on a continuous basis, by recycle of the halohydrocarbon gas to the laser cavity.

Isotope exchange between streams of liquid water and gaseous hydrogen is known to be efficiently promoted by highly dispersed platinum and other Group VIII metals when said metals are dispersed in a porous matrix of inherently hydrophobic materials such as Teflon (trademark): see "Process for the Exchange of Hydrogen Isotopes Between Streams of Gaseous Hydrogen and Liquid Water". J. H. Rolston, W. H. Stevens, J. den Hartog and J. P. Butler, U.S. Pat. No. 4,025,560, May 24, 1977 and "Catalytically Active Mass for the Exchange of Hydrogen Isotopes Between Streams of Gaseous Hydrogen and Liquid Water". J. P. Butler, J. H. Rolston, J. den Hartog, F. W. Molson and J. W. Goodale, U.S. Pat. No. 4,228,034, Oct. 14, 1980. Such catalysts have been found by the applicants to be entirely ineffective for exchange of hydrogen isotopes between streams of liquid water and gaseous fluoroform.

It is known that the isotopic exchange (protium, deuterium, tritium) between liquid water and gaseous fluoroform can be promoted by the addition of an alkali metal hydroxide, e.g. sodium hydroxide, or an organic hydroxide, e.g. tetramethylammonium hydroxide, to the aqueous phase: see E. A. Symons, M. J. Clermont, J. Am. Chem. Soc. 103, 3127 (1981); E. A. Symons, M. J. Clermont, L. A. Coderre, J. Am. Chem. Soc. 103, 3131 (1981). Such strongly basic solutions promote exchange between the two reactants but for an industrial process suffer from the difficulties and costs associated with the recovery of caustic from the liquid phase. In addition, the use of such homogeneous catalysts in a single aqueous phase is unwieldly for an effective isotope enrichment process which involves separate multiple isotopic equilibrations between gas and liquid phases. Alternatively, if such catalysts are used in a countercurrent enrichment cascade there is the expense and the necessity of recovering the caustic from the aqueous phase.

There is, therefore, a need for a process for the exchange of hydrogen isotopes between streams of liquid water and gaseous halohydrocarbon, and an apparatus therefor which will efficiently exchange isotopes of hydrogen between liquid water and gaseous halohydrocarbons while overcoming the aforementioned disadvantages of known processes in this field. Ion exchange resins are collections of small solid spherical particles comprised of two and three dimensional polymeric structures. Pore size within the resin varies inversely with the degree of cross-linking of the polymer chains. In the case of anion exchange resins, chemically bonded to the polymer backbone are cationic groups that have associated with them, depending on the form, anions such as chloride, acetate, bicarbonate or hydroxide, for example. The forms can be converted from any one to any other. These anions, although held in the near vicinity of their respective chemical groups by strong electrostatic charge fields, are nonetheless able to act in chemical reactions occurring near them. See. e.g., M. J. Astle, J. A. Zaslowsky, Ind. Eng. Chem. 44, 2867 (1952).

According to the present invention there is provided a process for the exchange of hydrogen isotopes between streams of liquid water and gaseous halohydrocarbon, comprising:

(a) bringing the streams into contact with one another and a catalytically active mass, of packing elements each comprising a roll of a corrugated open mesh screen and a plane web and a catalyst filling in the roll consisting a porous anion exchange resin in the hydroxide ion form, the screen and the web being wound together with open, corrugation interstices for the flow of gaseous fluoroform and liquid water therealong, the liquid water stream containing a concentration of a hydrogen isotope in excess of that which it would contain when the liquid water and gaseous halohydrocarbon streams are in isotopic equilibrium at the operating conditions of temperature and mass flow rates of the streams, and the other being a deficient stream and containing a concentration of the hydrogen isotope which is less than that which it would contain when the liquid water and gaseous halohydrocarbon streams are in equilibrium at said operating conditions, so that the said deficient stream is enriched by transfer of the hydrogen isotope from the other stream, and (b) decomposing the said gaseous halohydrocarbon stream enriched in that hydrogen isotope by isotope seelctive photo-decomposition into a first stream of gaseous halohydrocarbon depleted in that hydrogen isotope.

(c) removing as a product the first stream enriched in that isotope, and (d) recycling the second stream for enrichment once again with that hydrogen isotope.

Further according to the present invention there is provided a catalytically active mass for the exchange of hydrogen isotopes between streams of liquid water and gaseous halohydrocarbon at an operating temperature in the range 0° to 100° C., comprising a porous anion exchange resin in the hydroxide ion form.

In some embodiments of the present invention the gaseous halohydrocarbon is fluoroform, $CF_3H$.

In some embodiments of the present invention the anion exchange resin is in the hydroxide ion form with the hydroxide ion concentration dispersed in the resin in the range 2 to 5 milliequivalents per g of the dry resin.

In some embodiments of the present invention a dipolar aprotic liquid, for example dimethyl sulfoxide (DMSO, $CH_3SOCH_3$), is added as a miscible co-solvent with the water stream to further enhance the reactivity of the hydroxide ions on the anion exchange resin.

In some embodiments of the present invention, the stream of liquid water is contacted with a stream of gaseous fluoroform in a column that comprises a series of fluidized bed trays, each of which contain an aqueous slurry of the catalytically active mass. The catalytically active mass consists of particles of anion exchange resin in the hydroxide ion form. The trays are designed so that the resin particles are retained on the trays during passage of the gaseous stream upwards and the liquid stream downwards.

In some embodiments of the present invention, the stream of liquid water is contacted with a stream of gaseous fluoroform in a column packed with a catalytically active mass. The catalytically active mass comprises an anion exchange resin, containing hydroxide ions (2–5 milliequivalents/g), the particles of which are constrained between layers of open mesh hydrophilic screens which are interspersed with layers of open mesh hydrophobic screens and open channels. These configurations provide for efficient countercurrent contacting of the liquid and gaseous streams in a packed exchange column while isolating the solid catalyst from the liquid stream.

In some embodiments of the present invention the corrugated, open mesh screen is hydrophilic, and the plane web of a hydrophilic, woven or matted textile material, and the anion exchange resin is held as a filling in the corrugation interstices between only two facing sides of the corrugated screen and the web.

Preferably the plane web is of a hydrophilic, woven or matted textile material selected from the group consisting of cotton cloth and flexible, cellulose fibre mat.

In other embodiments of the present invention each packing element comprises a corrugated hydrophobic screen, and two, plane, hydrophilic screens wound together to form the roll, with the anion exchange resin held as a filling layer between the two hydrophilic screens.

In other embodiments of the present invention each packing element comprises two corrugated, hydrophilic screens with the anion exchange resin held as a filling layer between the hydrophilic screens and a plane hydrophobic screen wound together with the hydrophilic screens to form the roll.

In other embodiments of the present invention each packing element comprises a corrugated hydrophobic screen, and a plane membrane containing the porous anion exchange resin filling and wound together with the hydrophobic screen to form the roll.

Preferably the hydrophobic screen material is selected from the group consisting of polytetrafluoroethylene, polyethylene and polypropylene.

Any of these anion exchange resin support units may be one of a plurality of packing elements in the packed column.

Figure 2:
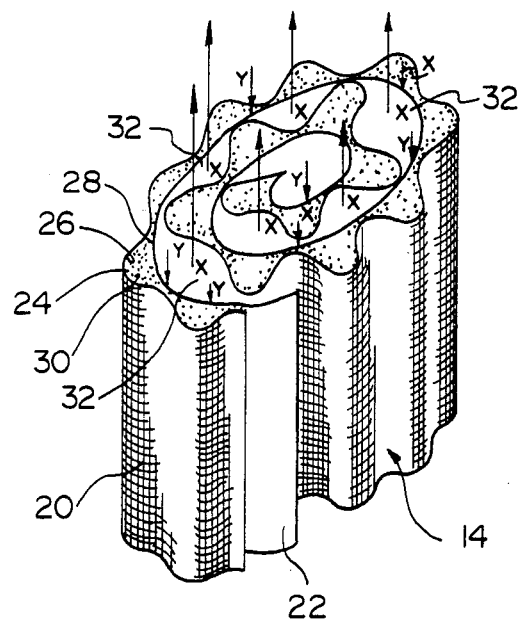

In the accompanying drawings which illustrate, by way of example, embodiments of the present invention, FIG. 1 is a flow diagram showing the use of a catalytically active mass to provide a recycle stream of isotopically enriched fluoroform to an isotope-selective photodecomposition process, FIG. 2 is an enlarged isometric view of one configuration of the catalytically active mass shown in FIG. 1.

Figure 5:
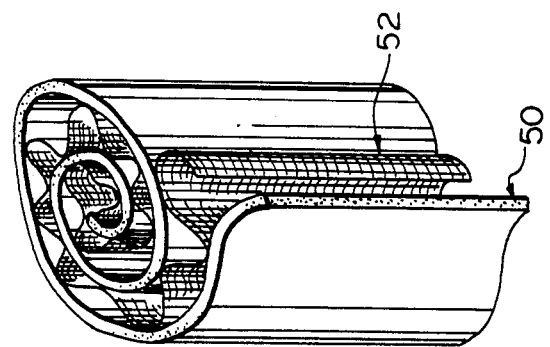
Figure 4:
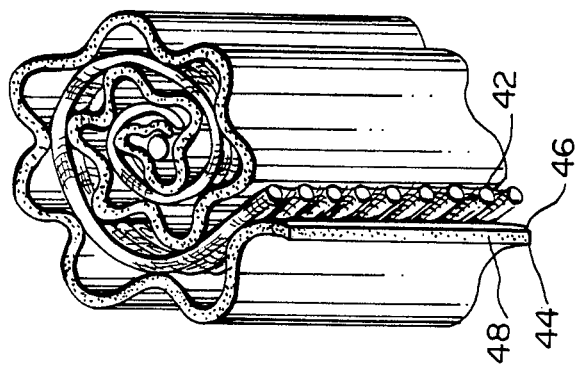
Figure 3:
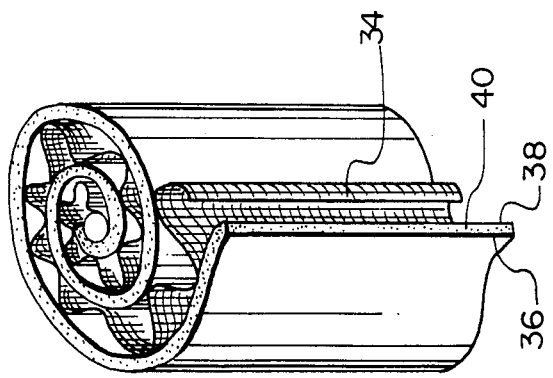
Figure 6:
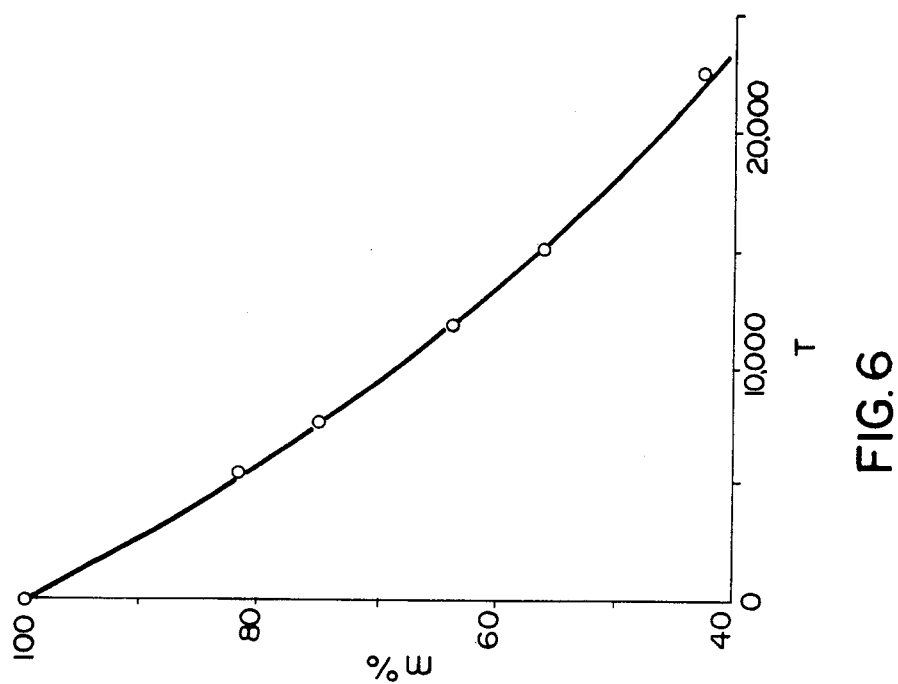

FIGS. 3, 4 and 5 are isometric views of different catalytically active masses to that shown in FIG. 2, and FIG. 6 is a graph of experimental results for mole percent $CF_3H$ (balance $CF_3D$) plotted against the reaction time in seconds for the catalytically active mass shown in FIG. 4.

In FIG. 1 there is shown deuterium-containing fluoroform gas ($CF_3H, CF_3D$) being fed along line 1 to an isotope selective photodecomposition apparatus, generally designated 2, where a laser beam 4 from a source 6 causes decomposition of the deuterium-containing fluoroform gas into deuterium-enriched, gaseous products ($DF + CF_2$), which are removed along line 8, and leaves deuterium-depleted, gaseous fluoroform ($CF_3H$), which is removed along line 10.

The deuterium-depleted, gaseous fluoroform is fed along line 10 to the lower end of a catalyst-packed-bed exchange column 12 to pass upwards through a catalytically active mass formed of stacked packing elements 14 forming a packed column.

Deuterium-containing liquid water is fed from line 16 to trickle downwards through the packing elements 14 while the operating temperature in the exchange column 12 is maintained at an appropriate temperature in the range 0° to 100° C., and the flow rates of the depleted, gaseous fluoroform and liquid water therethrough are chosen so that gaseous fluoroform is enriched with deuterium from the liquid water.

The deuterium-depleted water drains from the exchange column along line 18 while the gaseous fluoroform, enriched with deuterium, is passed along line 1 to the apparatus 2.

Several possible versions of the stacked packing element 14 are shown in detail in FIGS. 2, 3, 4 and 5.

Referring now to FIG. 2, the packing element generally designated 14 comprises a corrugated, open mesh, hydrophilic screen 20, a plane web 22 of a hydrophilic, woven or matted textile material wound together with the screen 20 to form a roll, and a layer 24 of anion exchange resin particles held as a catalyst filling in the corrugation interstices between only two facing sides 26 and 28 of the screen 20 and the web 22 respectively. The mesh size is chosen so that the resin particles cannot pass through the screens.

In the operation, the gaseous fluoroform flows upwards, in the direction of arrows X, along the open, corrugation interstices 32, while the liquid water trickles downwards in the direction of arrows Y, along and over the hydrophilic woven matted textile material 22. The hydrophilic nature of the screen 20 and the plane web 22 substantially eliminates any flooding of the corrugation interstices 32 by the liquid water because the liquid water tends to flow along portions of the corrugation interstices 32 that are adjacent to the screen 70 and the plane web 22. The hydrophilic nature of the screen 20 and the plane web 22 also cause a large surface area of contact between liquid water and the gaseous fluoroform.

The deuterium exchange occurs primarily in the following manner:

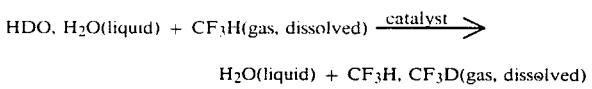

$HDO, H_2O(liquid) + CF_3H(gas, dissolved) \xrightarrow{catalyst}$ $H_2O(liquid) + CF_3H, CF_3D(gas, dissolved)$ Suitable anion exchange resins are:
(i) that marketed under the trademark Rexyn 201 (OH) by Fisher Scientific Company, Pittsburgh, Pa., U.S.A., (ii) those marketed under the trademarks Amberlyst A-26 and A-27 by BDH Chemicals Ltd., Toronto, Ontario, Canada, after conversion to the hydroxide ion form by standard treatment with caustic solution.

Suitable materials for other parts of this packing element are:

(i) for corrugated, open mesh, hydrophylic screen, stainless steel gauze (screen) of various mesh sizes (e.g. 250 to 300 micron opening), marketed by Tycan International, St. Catherines, Ontario, Canada, after treatment in air at 500° C. for 8 hrs. to make the screen surface hydrophilic, (ii) for the plane web of a hydrophilic, woven or matted textile material, cotton cloth or flexible, cellulose fibre mat which show a strong tendency to wick water by capillary attraction between adjacent fibres.

Referring now to FIG. 3, there is shown a different packing element to that shown in FIG. 2, comprising a corrugated, hydrophobic screen 34, two plane, hydrophilic screens 36 and 38 wound together to form a roll, and a layer 40 of anion exchange resin particles in the hydroxide ion form held as a catalyst filling between the two plane hydrophilic screens 36 and 38.

The packing element shown in FIG. 3 may be used in the exchange column 12 except that in this case it is the screen 34 that substantially eliminates flooding of the corrugated interstices, while the resin particles are retained between flat hydrophilic screens.

Suitable anion exchange resins are:

(i) that marketed as Rexyn 201 (OH) by Fisher Scientific Company, Pittsburgh, Pa, U.S.A., (ii) those marketed as Amberlyst A-26 and A-27 by BDH Chemicals Ltd., Toronto, Ontario, Canada, after conversion to the hydroxide ion form by standard treatment with caustic solution.

Suitable materials for other parts of this packing element are:

(i) for the corrugated, hydrophobic screen, polytetrafluoroethylene, polyethylene, or polypropylene, particularly that marketed under the trademark Spectramesh (e.g. 250 to 300 micron mesh opening) by Spectrum Medical Industries, Inc., Los Angeles, Ca., U.S.A.,.

(ii) for the hydrophilic stainless steel gauze (screen), various mesh sizes (e.g. 250 to 300 micron opening) marketed by Tycan International, St. Catherines, Ontario, Canada, after treatement in air at 500° C. for 8 hrs. to make the screen surface hydrophilic.

Referring now to FIG. 4, there is shown a different packing element to that in FIG. 3. In this case the layer or catalyst filling of anion exchange resin particles 48 is held between two corrugated, hydrophilic screens 44 and 46, and interspaced with a plane, hydrophobic screen 42.

This packing element may also be used in the exchange column 12. In this case a larger surface area of resin is exposed to the gaseous halohydrocarbon. Suitable materials are those indicated for the element in FIG. 3.

Referring now to FIG. 5, there is shown a packing element incorporating a plane, anion exchange resin membrane 50 interspaced with a corrugated hydrophobic screen 52. In this embodiment the catalyst filling is in the membrane.

A suitable anion exchange resin membrane is that marketed as Type MA 3475 by Ionac Chemical Co., Birmingham, N.J., U.S.A.

Suitable materials for the hydrophobic screen are those made from polytetrafluoroethylene, polyethylene or polypropylene, particularly those marketed as Spectramesh (e.g. 250 to 300 micron mesh opening) by Spectrum Medical Industries, Inc., Los Angeles, Ca., U.S.A.

Suitable anion exchange resins are:

(i) that marketed under the trademark Rexyn 201 (OH) by Fisher Scientific Company, Pittsburgh, Pa., U.S.A.

(ii) those marketed under the trademarks Amberlyst A-26 and A-27 by BDH Chemicals Ltd., Toronto, Ontario Canada, after conversion to the hydroxide ion form by standard treatment with caustic solution.

The following tests were carried out to verify the present invention.

TEST 1

A test was carried out to show that platinum highly dispersed in a porous polytetrafluoroethylene matrix (and known to be effective for exchange of hydrogen isotopes between streams of liquid water and gaseous hydrogen) is entirely unsuitable for isotopic exchange between liquid water and gaseous fluoroform. Accordingly a liquid water stream containing a deuterium atom concentration substantially above that which would be expected for an equilibrium distribution between liquid water and gaseous fluoroform was contacted countercurrently at 50° C. with said fluoroform stream in a column containing a 0.2% Platinum catalyst on rough ceramic spheres prepared according to the teachings of U.S. Pat. No. 4,228,034 and pretreated with hydrogen gas for one hour to activate. The deuterium concentration of the fluoroform was monitored by mass spectrometric analysis after initiating the flows of liquid water and gaseous fluoroform. No detectable increase above the initial deuterium concentration was observed in the gaseous fluoroform over a 26 hour period, which indicates the absence of any catalysis of exchange of hydrogen isotopes between the liquid water and gaseous fluoroform. It was therefore concluded that catalysts of the type prepared according to the teachings of U.S. Pat. No. 4,228,034 are totally unsuitable for exchange of hydrogen isotopes between liquid water and gaseous fluoroform.

TEST 2

The following test was carried out to show that isotopic exchange between water and gaseous fluoroform does not occur to an appreciable extent even at elevated temperatures in the presence of wet proofed catalysts prepared according to the teachings of U.S. Pat. No. 4,228,034, and containing 0.2% by weight of platinum, rhodium, palladium and osmium. Accordingly catalystspheres of each catalyst in turn were placed in 100 ml of water in a glass vessel along with 17 $\mu$l of $D_2O$. The flask contents were frozen and entrapped air was removed by evacuation and replaced by 50 kPa of fluoroform vapour of natural deuterium abundance. The flask was sealed and heated to 200° C. for 17 hours. Samples of fluoroform were withdrawn from the cell and analyzed for deuterium by mass spectrometry. No increase over the initial natural deuterium level was noted for any of the four catalysts and it was concluded that such catalysts are totally ineffective for promoting isotopic exchange between fluoroform and water.

TEST 3

The following test was carried out to show that isotopic exchange between liquid water and gaseous fluoroform is extremely slow in the absence of a suitable catalyst. The experimental exchange column described in Test 1 was fitted with a stainless steel/polyethylene mesh spiral assembly containing no anion exchange resin catalyst. No deuterium transfer between countercurrent streams of $D_2O$ and $CF_3H$ was detected during a 5.5 h run at 51° C.

TEST 4

The following test was carried out to show that exchange rates improved over TEST 3 can be attained by adding homogeneous hydroxide ion to the aqueous phase. When a solution containing 1 mole of NaOH per liter of $D_2O$ was contacted with $CF_3H$ at 0.1 kPa pressure in a countercurrent fashion in the exchange column at 50° C. (column configuration as for TEST 3), there was a slow but steady transfer of the deuterium isotope from the liquid water to the gaseous fluoroform. Note that for such a homogeneous catalyst solution, a stirred gas/liquid type of system is more efficient for gas-liquid-catalyst contacted. See: E. A. Symons, M. J. Clermont, *J. Am. Chem. Soc.* 103, 3127 (1981). Under comparable conditions, sodium hydroxide solution was observed to be of the order of 5 times more effective on a perhydroxide-ion basis when used in the stirred gas/liquid reactor than in the exchange column.

TEST 5

The following test was carried out to show that the addition of a anion exchange resin in the hydroxide ion form is unexpectedly efficient in promoting isotopic exchange between liquid water and gaseous fluoroform when compared with the results of TEST 4. Indeed by comparing these test results it can be demonstrated that the anion exchange resin particles are a factor of the order of 50 times greater in catalytic activity (in the stirred gas/liquid reactor) when compared on a per-hydroxide-ion basis.

In the stirred gas/liquid reactor (volume 260 mL) were placed either [60 mL of 1.0 mol. $L^{-1}$ aqueous NaOH solution] or [33 g wet (Ca 60 weight percent water) Rexyn 201 (OH) resin plus 34 mL water]. $CF_3D$ gas at 0.1 kPa pressure was stirred with each of these catalyst systems in turn at 68° C. The observed rate constants for change in $CF_3D$—CF composition in the vapour phase were $1.0 \times 10^{-4} s^{-1}$ and $5.0 \times 10^{-3} s^{-1}$ for the NaOH and resin catalyst systems, respectively, on a per-hydroxide-ion basis.

TEST 6

The following test was carried out to show that the addition of a dipolar aprotic liquid like dimethyl sulfoxide (DMSO) as miscible co-solvent with the water leads to further enhancement of resin-based hydroxide ion reactivity for fluoroform-water deuterium exchange. In the gas/liquid stirred reactor, 60 mL of Rexyn 201 (OH) resin slurry containing 33 mole percent DMSO in $H_2O$ were contacted with $CF_3D$ gas at 49° C. The observed rate constant for deuterium isotope exchange between the water and the fluoroform is compared in the table below with data obtained using an equal volume of slurry with no added DMSO. Also included are the corresponding data for homogeneous NaOH solutions. Addition of DMSO increases the specific activity of the resin-held hydroxide ion by only ~30x, compared to 5000x for the homogeneous hydroxide solutions.

| EFFECT OF $^-OH$ SOURCE AND ADDITION OF DMSO ON RATE CONSTANT FOR $CF_3D/H_2O$ EXCHANGE. | | |
|---|---|---|
| $^-OH$ SOURCE | MOLE % DMSO | $k_{obs}$ (Vapour), $s^{-1}$, PER MOLE $^-OH$ |
| NaOH | 0 | ~5.4 × $10^{-6}$ |
| NaOH | 33 | ~2.9 × $10^{-2}$ |
| Rexyn 201 Resin | 0 | ~7.7 × $10^{-4}$ |
| Rexyn 201 Resin | 33 | ~2.4 × $10^{-2}$ |

TEST 7

In the following tests, several types of anion exchange resin were compared under slurry and column conditions. Allowing for experimental error (mainly partial loss of reactivity due to contact with the carbon dioxide in air) and the 8° C. differential in temperature, the resin reactivities are comparable on a per-hydroxide-ion basis (see table below) in the slurry and in the column.

| RESIN (in $^-OH$ form)++ | DRY EXCH. CAPACITY | PORE SIZE | PARTICLE SIZE, mm | EXCHANGE RATE CONSTANT+ $k_{obs}$ (vapour), $s^{-1}$, per mole $^-OH$ | |
|---|---|---|---|---|---|
| | | | | STIRRED SLURRY** | TEST COLUMN+++ |
| Rexyn 201 (Fisher Scientific) | ~4.0 meq. $g^{-1}$ | "medium" | ~0.4–0.5 | ~4 × $10^{-3}$ | 9.4 × $10^{-5}$ |
| Amberlyst A-26 (BDH Chemicals) | ~4.2 meq. $g^{-1}$ | "large"* | ~0.45–0.55 | 1.3 × $10^{-3}$ | — |
| Amberlyst A-27 (BDH Chemicals) | ~2.6 meq. $g^{-1}$ | "large"* | ~0.4–0.5 | 2.0 × $10^{-3}$ | 3.3 × $10^{-5}$ |
| Ionac (membrane) MA3475 | ~0.7 meq. $g^{-1}$ | — | — | — | 5.0 × $10^{-5}$ |

+ corrected to common stirred reactor vapour volume
++ all are polystyrene-divinylbenzene copolymers with tetra alkyl quaternary ammonium function
*macroreticular type
**approx. 60 mL of aqueous slurry and 200 mL vapour space, at 59° C.; $CF_3H + D_2O$
+++ approx. 300 mL water and 2200 mL vapour space, at 51° C.; $CF_3H + D_2O$ Referring now to FIG. 7, there is shown a graph of experimental results for the mole percent $CF_3H$ (balance $CF_3D$, designated m %, plotted against the reaction time in seconds, designated T, for the catalytically active mass shown in FIG. 4 used for the exchange of deuterium from liquid heavy water ($D_2O$) to gaseous fluoroform ($CF_3H$).

The results are from a kinetic run in a test column at 50° C., using 300 mL of $D_2O$ and 300 mL of wet Rexyn 201 (OD) resin as the anion exchange resin.

We claim:

1. A process for the exchange of hydrogen isotopes between streams of liquid water and gaseous halohydrocarbon comprising:
   (a) bringing the streams into contact with one another, and a catalytically active mass, of packing elements each comprising a roll of a corrugated open mesh screen and a plane web and a catalyst filling in the roll consisting of a porous anion exchange resin in the hydroxide ion form, the screen and the web being wound together with open, corrugation interstices for the flow of liquid water and gaseous fluoroform therealong, the streams and catalytically active mass being brought into contact at an operating temperature in the range of the order of 0° to 100° C., the liquid water stream containing a concentration of a hydrogen isotope in excess of that which it would contain when the liquid water and gaseous halohydrocarbon streams are in isotopic equilibrium at the operating conditions of temperature and mass flow rates of the streams, and the gaseous halohydrocarbon stream being a deficient stream and containing a concentration of that hydrogen isotope which is less than that which it would contain when the liquid water and gaseous halohydrocarbon streams are in equilibrium at said operating conditions, so that the said deficient, gaseous halohydrocarbon stream is enriched by transfer of that hydrogen isotope from the liquid water stream, (b) decomposing the said gaseous halohydrocarbon stream enriched in that hydrogen isotope by isotope selective photo-decomposition into a first stream of gaseous products, enriched in that hydrogen isotope, and a second stream of gaseous halohydrocarbon depleted in that hydrogen isotope, (c) removing as a product the first stream enriched in that isotope, and (d) recycling the second stream for enrichment once again with that hydrogen isotope.

2. A process according to claim 1, wherein the gaseous halohydrocarbon is fluoroform, $CF_3H$.

3. A process according to claim 1, wherein the hydroxide ion concentration in the anion exchange resin is in the range 2 to 5 milliequivalents per g of the dry resin.

4. A process according to claim 1, wherein a stream of dipolar aprotic liquid is combined as miscible co-solvent with the liquid water stream before the liquid water stream is brought into contact with the stream of gaseous halohydrocarbon and the catalytically active mass, and the dipolar aprotic liquid is removed from the liquid water stream after the contacting of the liquid water stream with the gaseous halohydrocarbon and the catalytically active mass.

5. A process according to claim 4, wherein the dipolar aprotic liquid is dimethyl sulfoxide (DMSO, $CH_3SOCH_3$).

6. Hydrogen isotope exchange apparatus for effecting exchange between streams of liquid water and gaseous halohydrocarbon comprising:

(a) a catalytically active mass of packing elements each comprising a roll of a corrugated open mesh screen and a plane web and a catalyst filling in the roll consisting of a porous anion exchange resin in the hydroxide ion form, the screen and the web being wound together with open, corrugation interstices for the flow of liquid water and gaseous fluoroform therealong, (b) contacting means, comprising an ion exchange column containing the packing elements as a catalyst packed bed, for bringing the streams into contact with one another, and the catalytically active mass, at an operating temperature in the range of the order of 0° to 100° C., whereby, when the liquid water stream in the said contacting means containing a concentration of a hydrogen isotope in excess of that which it would contain when the liquid water and gaseous halohydrocarbon streams are in isotopic equilibrium at the operating conditions of temperature and mass flow rates in the said contacting means, and the gaseous halohydrocarbon stream being a deficient stream and containing a concentration of that hydrogen isotope which is less than that which it would contain when the liquid water and halohydrocarbon streams are in equilibrium at said operating conditions, the deficient, gaseous halohydrocarbon stream will be enriched by transfer of that hydrogen isotope from the liquid water, (c) isotope selective photo-decomposition apparatus for decomposing the said gaseous halohydrocarbon stream enriched in that hydrogen isotope into a first stream of gaseous products, enriched in that hydrogen isotope, and a second stream of gaseous halohydrocarbon depleted in that hydrogen isotope, (d) pipe means connected to the isotope selective photo-decomposition apparatus for removing therefrom the first stream enriched in that isotope as a product, and (e) a recycling pipe connected to the isotope selective photo-decomposition apparatus and the exchange column for recycling the second stream for enrichment once again with that isotope.

7. Apparatus according to claim 6, wherein the hydroxide ion concentration in the anion exchange resin is in the range 2 to 5 milliequivalents per g of the dry resin.

8. Apparatus according to claim 6, wherein the corrugated, open mesh screen is hydrophilic, and the plane web is of a hydrophilic, woven or matted textile material, and the anion exchange resin is held as a filling in the corrugation interstices between only two facing sides of the corrugated screen and the web.

9. Apparatus according to claim 8, wherein the plane web is of a hydrophilic, woven or matted textile material selected from the group consisting of cotton cloth and flexible, cellulose fibre mat.

10. Apparatus according to claim 6, wherein each packing element comprises a corrugated, hydrophobic screen, and two, plane, hydrophilic screens wound together to form the roll, with the anion exchange resin held as filling layer between the two hydrophilic screens.

11. Apparatus according to claim 6, wherein each packing element comprises two corrugated, hydrophilic screens, with the anion exchange resin held as a filling layer between the hydrophilic screen, and a plane, hydrophobic screen wound together with the hydrophilic screens to form the roll.

12. Apparatus according to claim 6, wherein each packing element comprises a corrugated hydrophobic screen, and a plane membrane containing the porous anion exchange resin filling and wound together with the hydrophobic screen to form the roll.

13. Apparatus according to claim 10, 11 or 12, wherein the hydrophobic screen material is selected from the group consisting of polytetrafluoroethylene, polyethylene and polypropylene.

* * * * *